(12) United States Patent
Stern et al.

(10) Patent No.: US 10,540,739 B2
(45) Date of Patent: Jan. 21, 2020

(54) PREDICTIVE APPLICATION CACHING

(71) Applicant: Roku, Inc., Los Gatos, CA (US)

(72) Inventors: David Stern, Los Gatos, CA (US);
Anthony Wood, Los Gatos, CA (US)

(73) Assignee: Roku, Inc., Los Gatos, CA (US)

( * ) Notice: Subject to any disclaimer, the term of this patent is extended or adjusted under 35 U.S.C. 154(b) by 369 days.

(21) Appl. No.: 15/359,747

(22) Filed: Nov. 23, 2016

(65) Prior Publication Data

US 2018/0143746 A1 May 24, 2018

(51) Int. Cl.
*G06F 3/048* (2013.01)
*G06T 1/60* (2006.01)
*H04L 29/06* (2006.01)
*H04L 29/08* (2006.01)

(52) U.S. Cl.
CPC ............ *G06T 1/60* (2013.01); *H04L 65/4084* (2013.01); *H04L 67/22* (2013.01); *H04L 67/2847* (2013.01)

(58) Field of Classification Search
CPC . G06F 3/0481; G06F 9/5027; H04N 21/4622; H04L 67/10
See application file for complete search history.

(56) References Cited

U.S. PATENT DOCUMENTS

| | | | |
|---|---|---|---|
| 7,165,265 B2 | 1/2007 | Mori et al. | |
| 9,319,755 B2 | 4/2016 | Fusco et al. | |
| 2009/0013128 A1* | 1/2009 | Peterson | G06F 9/443 711/113 |
| 2011/0265066 A1* | 10/2011 | Fee | G06F 9/5027 717/139 |
| 2012/0233640 A1* | 9/2012 | Odryna | H04N 21/4622 725/45 |
| 2013/0205314 A1 | 8/2013 | Ramaswamy et al. | |
| 2014/0059156 A1 | 2/2014 | Freeman, II et al. | |
| 2016/0085763 A1* | 3/2016 | Tatourian | H04L 67/10 707/662 |

OTHER PUBLICATIONS

International Search Report and Written Opinion of the International Searching Authority for International Application No. PCT/US2017/060547, dated Jan. 26, 2018 (11 pages).

* cited by examiner

*Primary Examiner* — Haoshian Shih
(74) *Attorney, Agent, or Firm* — Sterne, Kessler, Goldstein & Fox P.L.L.C.

(57) ABSTRACT

A predictive application cache is described. The predictive application cache intelligently selects which applications to cache to maximize caching effectiveness. In an embodiment, the selecting is based on user input and a graphical user interface. The predictive application cache then determines, based on the user input and the graphical user interface, which applications are likely to be selected by user input next. In an embodiment, the selecting is also based on historical usage information. In an embodiment, the selecting is based on crowd sourced information.

18 Claims, 15 Drawing Sheets

PREDICTIVE APPLICATION CACHING

FIELD

This disclosure is generally directed to application caching, and more specifically to a predictive application cache that intelligently selects which applications to cache to improve caching effectiveness.

BACKGROUND

A trend in multimedia consumption is the paradigm shift away from traditional broadcast video such as a cable or satellite broadcasts to one in which users select live or on-demand media to consume. This trend has disrupted the way in which consumers select and consume media. As a result, a plethora of multimedia sources are available to many consumers. For example, rather than having a single cable television subscription, a user may now have subscriptions to several different streaming video services that each provide access to a unique catalog of video. A user may subscribe to individual channels, services, or collections of content from many sources. Examples of these services include but are not limited to Netflix™, Hulu™, Amazon Instant Video™, HBO Go™, Showtime Anytime™, among others. Each of these services provides an end user application for receiving their unique content offerings on an end user computing device such as a smart TV or set top streaming box.

The end user experience in consuming media from these sources is quite different than how media was consumed over broadcast cable or satellite television. In the old model, a user would tune a television to a channel and see whatever was being broadcast at that time. The user had no choice of content other than to change the channel. Under the new paradigm, a user of a computing device starts a provider's end user application. Then the user navigates a graphical user interface to select media to display. The end user application sends a request to the service provider for that unit of media, and after a period of buffering the media playback begins. A plethora of multimedia is available to view at any given time, and users are able to pause, rewind, and fast forward through much of it.

BRIEF SUMMARY

System, method, and a computer readable medium embodiments, and combinations and sub-combinations thereof, for predictive application caching are described herein. According to embodiments, the predictive application cache helps a streaming media device intelligently pre-load or cache applications that are likely to be executed in the future. In an embodiment, the predictive application cache does this by analyzing the graphical user interface presented to a user and determining based on the graphical user interface the applications most likely to be selected next. Then, based on this analysis, the predictive application cache loads those applications into memory. When a user selects an application that resides in cache memory, the streaming media device can execute directly from the cache memory.

Caching can speed up the time between a user selecting a particular application for launch and actually executing the application. In an embodiment, the applications are disseminated from a central repository in source code form. The source code are compiled to bytecode prior to execution, which requires time and computing resources. Thus, by performing the compilation ahead of time and storing the result, the user does not need to wait for the streaming media device to do the compilation after selection of an application. Similarly, the streaming media device may not have a copy of the application source code in its local memory. In this case the streaming media device needs to retrieve the source code from some remote repository. This may introduce network delays and latencies. So, in an embodiment, the predictive application cache also pre-fetches the source code ahead of time and stores the source code in the application cache before it is needed to reduce the time for applications to load. Finally, in some embodiments, the bytecode can be pre-translated into machine code and run directly by the processor rather than a virtual machine. In these embodiments, the pre-translated machine code can also be cached ahead of time.

Further features and advantages of embodiments, as well as the structure and operation of various embodiments, are described in detail below with reference to the accompanying drawings. It is noted that this disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for caching applications on a media streaming device.

Media Streaming Device Environment

Figure 1A:
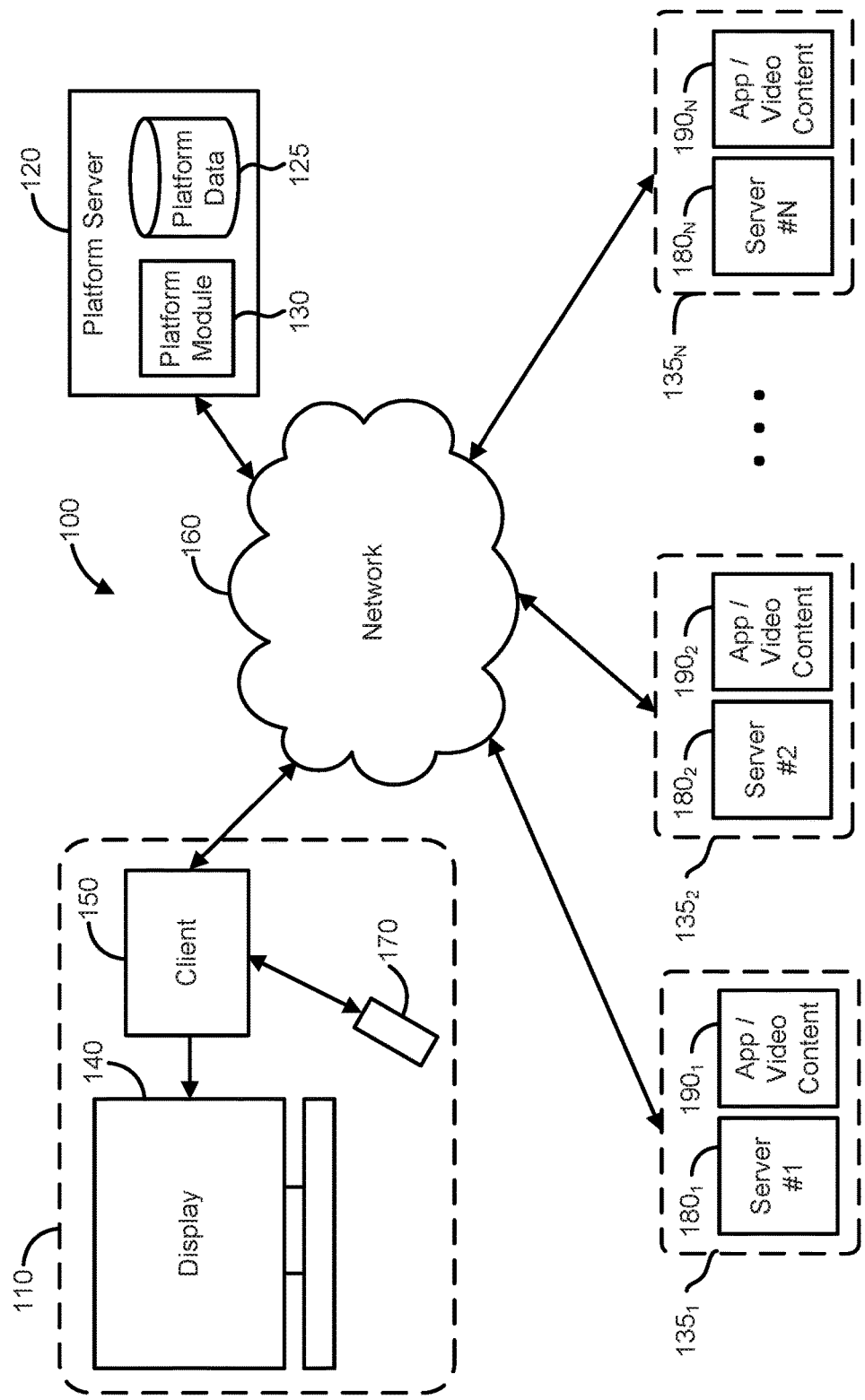
FIG. 1A is a block diagram of a data streaming device according to an embodiment.

FIG. 1A is a block diagram illustrating an embodiment of a streaming environment 100. In particular, the streaming environment 100 includes an interface system(s) 110, a platform server(s) 120, and one or more sources of content programming $135_1, 135_2, \ldots, 135_N$ (collectively and generically referred herein to as "content sources 135"). In an embodiment, the interface system 110 includes a display device 140 (e.g., monitor or television), a client device 150 (e.g. streaming player), and a user input device 170. The client device 150 is configured to communicate with the display device 140 and a network 160. The client device 150 may be distinct from the display device 140, or may be integrated with or into the display device 140.

In an embodiment, the platform server 120 includes a database 125 and a platform module 130. The database 125 is configured to store data such as programming software packages. In some embodiments, the data within these programming software packages may include: the network locations and content descriptions of content sources 135, hardware/software capabilities of different firmware versions and specifications of the client device 150, customer data associated with each client device 150, and/or user interface information associated with the client device 150.

According to some embodiments, customer data may include customer specific information such as user preferences, usage history, demographic data, geographic data, ISP identification, and/or financial information. The platform server 120 may generate customized user interfaces for each client device 150 based at least in part one or more elements of the customer data in some embodiments. Additionally, the user interface from the platform server 120 may provide a selection of content such as audio, visual, movies, television shows, software, and gaming content (to name a few examples) to the client device 150. In this example, the platform server 120 is configured to supply a graphical representation of the selection content to the client device 150 and further allows the client device 150 to select and access individual content from the selected content from one or more of the content sources 135 through this graphical representation of the selection content.

In an embodiment, the platform server 120 is configured to receive input from client device 150 and may process the input through the platform module 130. The input from the client device 150 may include navigation and selection commands which may represent selection of content, search for content, and ongoing interaction with an application running on the platform server 120.

In an embodiment, the client device 150 displays content on display device 140. The content displayed on the display device is sourced from the client device 150, the platform server 120, and/or the content sources 135. Furthermore, the input device 170 may transmit signals to the client device 150. In an embodiment, the input device 170 may also utilize one of or a combination of: an infrared signal, WiFi signals, cellular signals, radio frequency signals, and Bluetooth signals (to name a few examples) to communicate with the client device 150.

The input device 170 is configured to enter data and to make user selections from the interface as presented through the client device 150. In an embodiment, the interface displayed by the client device 150 may be from the platform server 120, from the content sources 135, or be locally generated by the client device 150. In an embodiment, the input device 170 also includes a display to show additional content. In another embodiment, the input device 170 includes a touch screen which allows content to be displayed and input to be received. Exemplary input devices 170 include remote controls, smart phones, tablets, and mobile computers, to name just a few examples.

In an embodiment, the content sources 135 include a server 180 and a storage device with content 190. In an embodiment, the network address of particular content stored within the storage device 190 is maintained within the platform server 120. In another embodiment, the general location of the content source 135 is maintained and stored within the platform server 120 while the specific locations of corresponding content are managed locally by the content source 135. In yet another embodiment, the location of the content source 135 is embedded within the graphical representation displayed through the client device 150 such that interaction with the graphical representation through the client device 150 allows the content located within the content source 135 to be accessible to the client device 150.

In an embodiment, the content stored within the storage device 190 may include any combination of music, video, still pictures, text, graphics, gaming applications, movies, television shows, and software to name just a few examples. In an embodiment, the particular content which is stored within the storage device 190 is provided to the client device 150 through the network 160. In an embodiment, the network 160 is the Internet. In another embodiment, the network 160 is a local area network.

In an embodiment, the client device 150 makes a request for specific content. If the requested content is video content, the storage device 190 of the content source 135 transmits video data that represents the specific video content to the client device 150 via the network 160.

In an embodiment, platform server 120 supports interfaces, such as login interfaces, search interfaces, and customized interfaces for the client device 150.

Figure 1B:
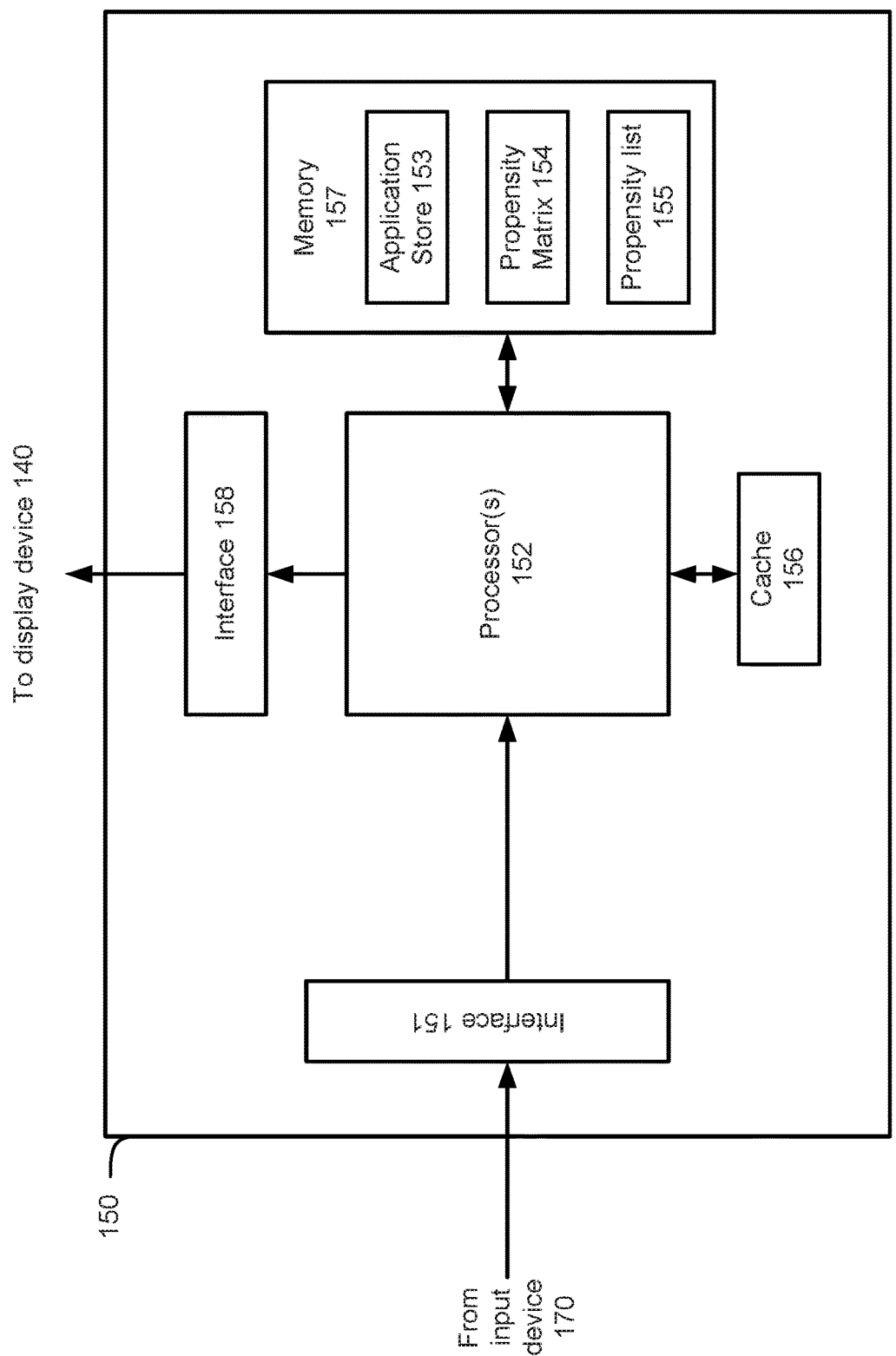
FIG. 1B is a block diagram of a client device according to an embodiment.

FIG. 1B is a functional block diagram depicting an example client device 150 according to various embodiments. As shown in FIG. 1B, client device 150 may include an input interface 151, one or more processors 152, a cache 156, a memory 157, and an output interface 158. According to various embodiments, the input interface 151 may be configured to receive user input from input device 170 and convey the user input to processor 152. The output interface 158 may be configured to transmit information to display 140. FIG. 1B depicts cache 156 as separate from processor 152, but cache may be separate from or part of processor 152 according to various embodiments.

Memory 157 may comprise any appropriate memory storage device and may be configured to store a number of different kinds of information. For instance, as shown in FIG. 1B, memory 157 contains an application store 153, a propensity matrix 154, and a propensity list 155. The application store 153 may contain a number of applications for execution by processor 152 in either compiled or un-compiled form. The propensity matrix 154 and propensity list 155 relate to aspects of the caching of applications from the application store 153 and will be discussed in greater detail, below.

Figure 2:
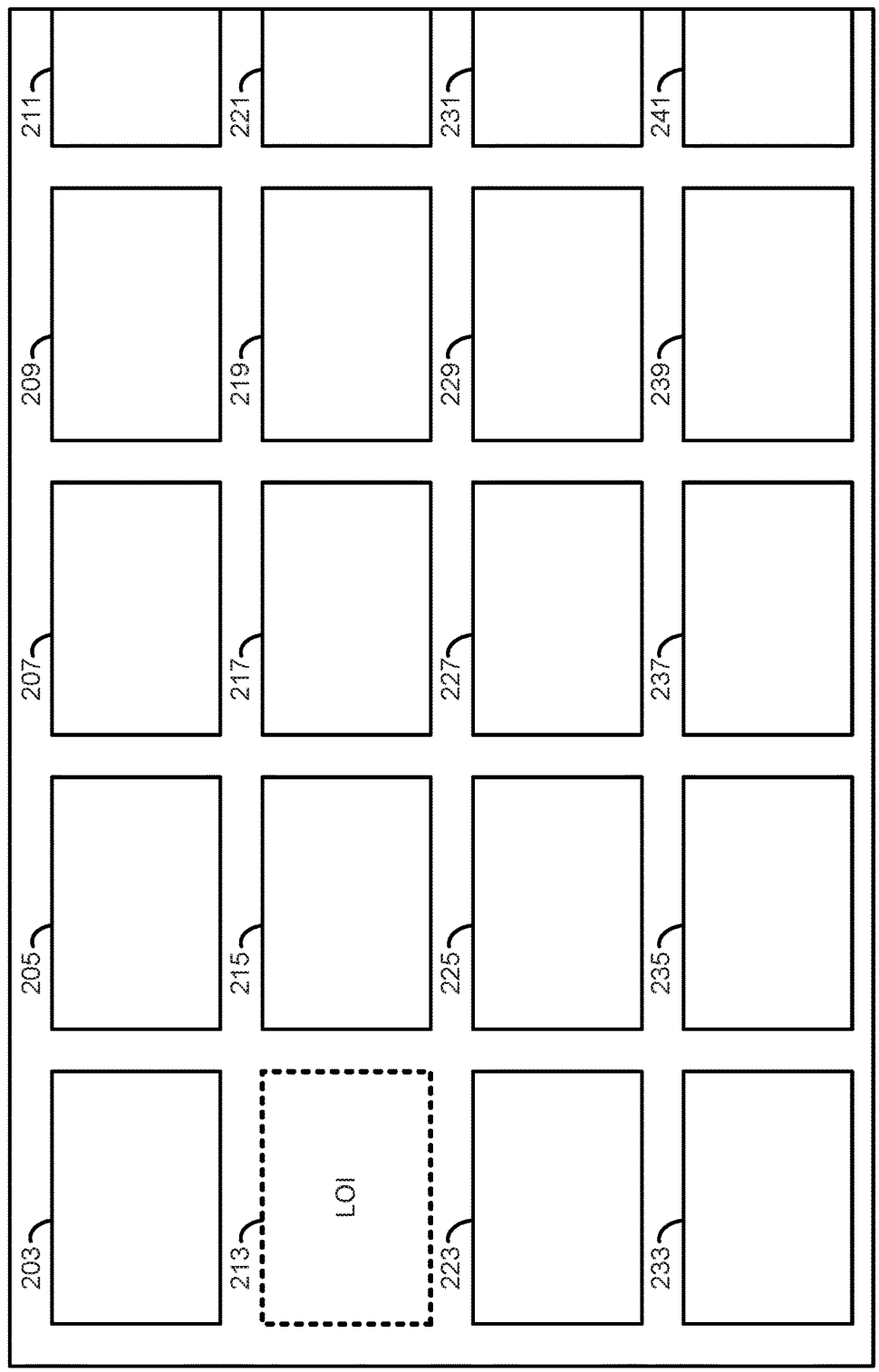
FIG. 2 illustrates an example graphical user interface according to an embodiment.

FIG. 2 illustrates an example graphical user interface (GUI) 200 that is generated by client 150 and displayed on display 140 according to an embodiment. GUI 200 comprises GUI elements 203-241, which in an embodiment is arranged in a grid-like fashion of rows and columns. For example, GUI elements 203-211 comprise a first row, GUI elements 213-221 comprise a second row, and so on. Likewise, GUI elements 203, 213, 223, and 233 comprise a first column, and GUI elements 205, 215, 225, and 235 comprise a second column, and so on. Some elements are at times only partially visible on screen, such as GUI elements 211, 221, 231, and 241.

GUI element 213 is highlighted in GUI 200. Assume this is the present focus of user input. This is referred to as the location of interest (LOI) of the GUI 200. The LOI 213 may be represented by a highlighting or animation in some embodiments. In other embodiments, the LOI 213 is not highlighted. LOI 213 is the focus of user input. Any user input that occurs will occur relative to or with regard to LOI 213. For example, a command to "select" issued when GUI 200 is displayed on screen will instruct the streaming media device to execute commands associated with LOI 213. Example of commands that may be associated with LOI 213 include but are not limited to initiating playback of media content such as video content, launching an application associated with LOI 213, or changing GUI to reflect the content or data represented by LOI 213.

In an embodiment, user input is discrete. In the embodiment depicted in GUI 200, a discrete user input of "down" will move the LOI to GUI element 223. Similarly, a discrete user input of "right" will move the LOI to GUI element 215, and so on. The streaming media device may optionally update, animate, or change the GUI responsive to such a discrete movement. For example, if a user issues a "right" command, the LOI may move to GUI element 215, but in some embodiments the location on screen of GUI element 215 may move to the left so that it occupies the same relative position on the screen that was previously occupied by GUI element 213. In an embodiment this movement is a scrolling effect on the rows and columns of the GUI. In an embodiment then, a discrete movement "right" effectively scrolls the entire row such that each element is moved one unit to the left, scrolling GUI element 213 off of the screen, and presenting a new GUI element at the far right of the visible row. A byproduct of this type of scrolling effect is that the LOI remains at the same on-screen location, while the GUI elements change position. Similarly, a discrete user input to change columns shifts all columns in the opposite direction to maintain the LOI in the same relative location on screen. In this way, users are able to quickly and easily traverse many GUI elements with ease and speed.

In other embodiments, the GUI behavior may be different. For example, another embodiment involves moving the LOI on screen to the GUI element of interest, and not scrolling or otherwise changing the displayed grid. Other embodiments may have no grid at all, but present graphical representations of media in an amorphous or unstructured presentation. In other embodiments, user input is not discrete in the manner described above, but is free-form and unstructured such as a mouse or touch interface.

In an embodiment, each GUI element 203-241 is representative of a unit of content to be viewed or a submenu. Each unit of content available on the streaming media device may be associated with a content source and an application to consume the desired content. For example, GUI element 213 may be representative of a movie that is made available through a particular streaming media provider. That streaming media provider makes available a user application to consume the movie on the streaming media device. To watch the movie, the streaming media device may require a copy of the streaming media provider's application on the streaming media device, and then needs to execute or 'launch' that application. The adjacent GUI element 215 may represent another movie made available from another streaming media provider that requires a different application to view. Each GUI element 203-241, therefore, potentially requires a different application to execute on the streaming media device to consume.

Figure 3:
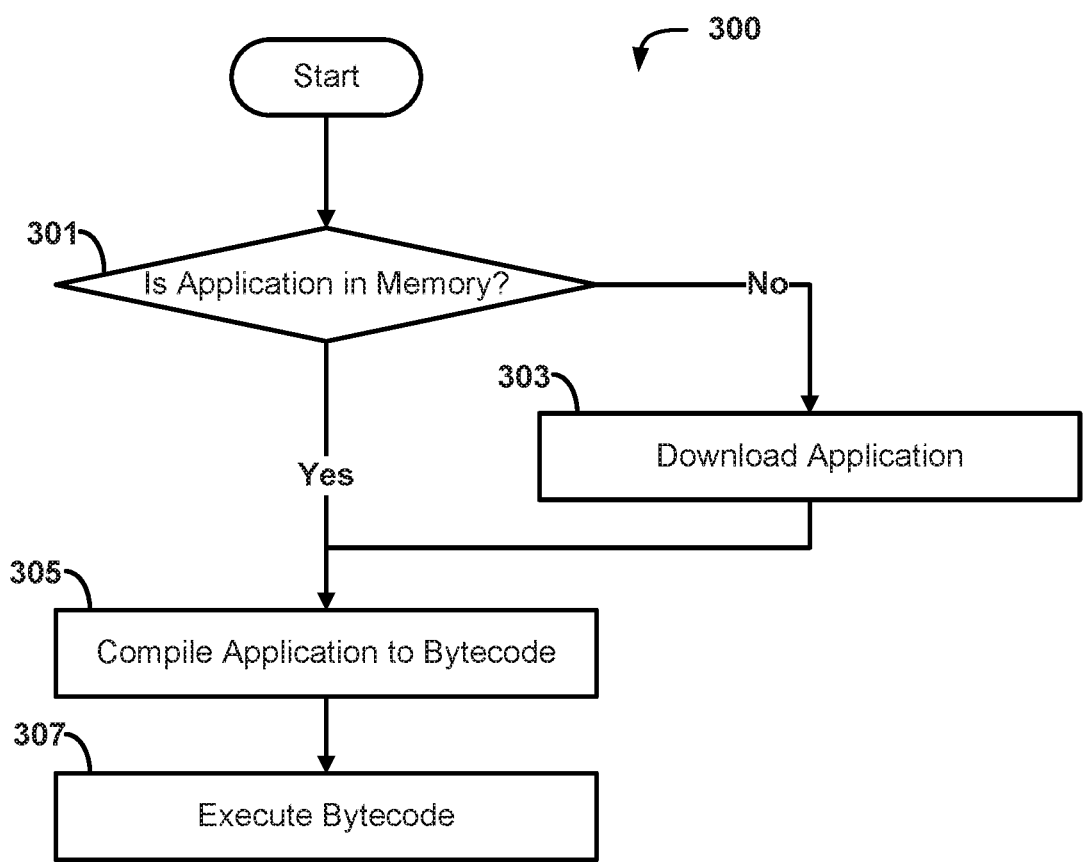
FIG. 3 is a flow diagram of a process of launching an application according to an embodiment.

Selecting an application to launch on a computing device such as the streaming media device initiates a series of events. In an embodiment, the applications are transported to the end user device (such as client device 150) in a source code format. This source code format is then translated into an intermediate bytecode format, and the bytecode is then executed by a virtual machine. The process 300 of launching an application is illustrated in FIG. 3 with respect to an embodiment. For ease of explanation process 300 will be described with respect to FIGS. 1A and 1B. However, it should be understood that process 300 is not so limited to the specific embodiments depicted in FIGS. 1A and 1B.

As shown in FIG. 3, process 300 begins at 301, where the streaming media device (e.g., client device 150) determines whether or not the executable instructions in source code format which comprise an application are in memory (such as memory 157). If the application is not in memory, at step 303 the streaming media device requests the application from a remote server (e.g., platform server 120) and downloads it via, e.g., network 160. Once the application is in memory, at 305, the streaming media device (e.g., client device 150) may compile the application. In some embodiments, the compilation may comprise compiling the application code to bytecode, which is configured to run on a virtual machine locally on the client device 150. However, according to other embodiments, the client device 150 may compile the application code into a format that is directly executable by client device 150. At 307, the client device executes the application either directly or using a a virtual machine.

The process 300 of downloading and compiling the application depicted in FIG. 3 takes time and computing resources. Furthermore, downloading and/or compiling can introduce network latency and delay that add further delay. All of these effects, taken together, may introduce a time delay between when a user issues a command to launch an application, and the application actually running. This delay is detrimental to the user experience. Users expect fast results when launching an application or selecting some media to display because their interest lies in consuming the media. If the delay is long enough, some user may wonder if the media streaming device is malfunctioning or inoperative. All of these effects detract from the enjoyable consumption of media which is the goal of the streaming media device.

To reduce time delay or lag to and thus maintain a high degree of user enjoyment and satisfaction, several techniques may be employed according to various embodiments. For example, storing the application script, bytecode, or machine code in a cache memory ahead of time reduces the delay. In such an embodiment the process becomes much faster because there is no need to download and compile an application because executable code (e.g., bytecode or machine code) is already present in the cache of the client device 150. Similarly, rather than compiling an application from source code to bytecode, it is often much quicker to retrieve the pre-compiled bytecode from memory.

Some virtual machine execution environments may have the capability to pre-compile bytecode into machine code. In some circumstances, this pre-compilation can have the perceived effect of faster execution time because it removes the step of the virtual machine loading and executing the bytecode. However, this last step may not be necessary in all embodiments as some implementations of bytecode-executing virtual machines might not benefit from this approach. Taken together, these various forms of doing work ahead of time and caching the result can decrease the time required from input to application launch to an absolute minimum. This decrease in lag then contributes to an overall user satisfaction with the streaming media device. Therefore in some embodiments it is desirable to pre-compute and cache, or store, the intermediate results of as much of the execution process as possible.

Figure 4:
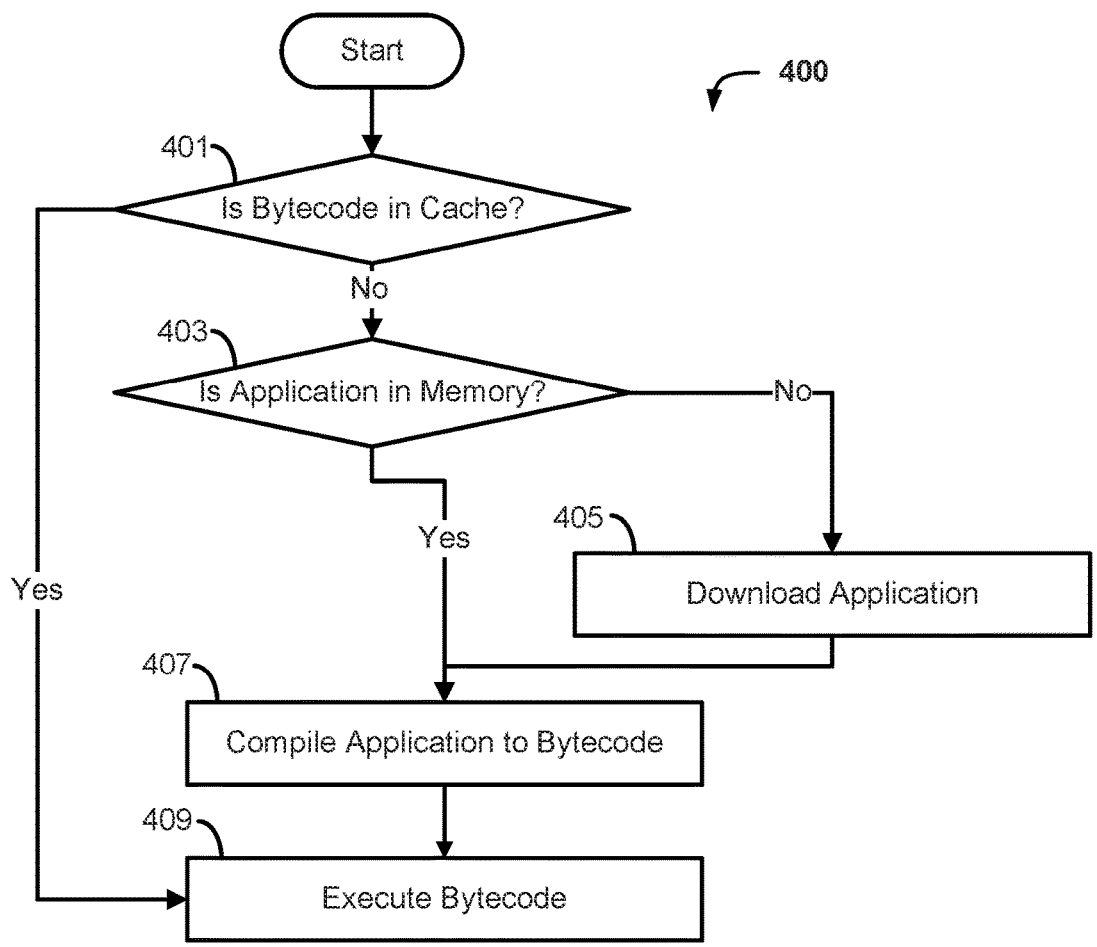
FIG. 4 is a flow diagram illustrating a process of predictive application caching according to an embodiment.

FIG. 4 is a flow diagram illustrating a process 400 for execution of an application using predictive application caching according to embodiments of the disclosure. For ease of explanation FIG. 4 and process 400 will be described with respect to FIGS. 1A and 1B. However, it should be understood that process 400 is not so limited to the specific embodiments depicted in FIGS. 1A and 1B.

As shown in FIG. 4, process 400 begins at 401, where it is determined whether the application (e.g., a bytecode or machine code version) is stored in the cache (e.g., cache 156) of client device 150. If the application is stored in cache 156, then the process may proceed to 409, where the application is executed by the client device 150. If, however, at 401, the process 400 determines that the application is not stored in cache 156, then process 400 proceeds to 403, where it is determined whether the application is stored in the memory (e.g., memory 157) of client device 150. If the application is not stored in the memory 157 of client device 150, then the process 400 may proceed to 405 where the application may be downloaded. According to some embodiments, the application may be downloaded from the platform server 120 via network 160. However, in some embodiments it is also possible for the client device to download the relevant application from one of the content sources 135 via network 160.

If, at 403, the process 400 determines that the application is stored in memory, then the process 400 may proceed directly to 407 where the application can be compiled by the client device 150. In some embodiments, compiling the application may take the form of generating a bytecode format for the application that can be run by a virtual machine executing on the client device 150. However, in some embodiments, the application may be compiled directly to machine code so that it may be directly executed by one or more processors 152 of the client device 150. If it is, then the bytecode can execute directly from cache at step 409. If the application bytecode is already cached, steps 403-407 can be bypassed. This lowers the amount of time between the request to execute the application, and the execution of the application.

Figure 5:
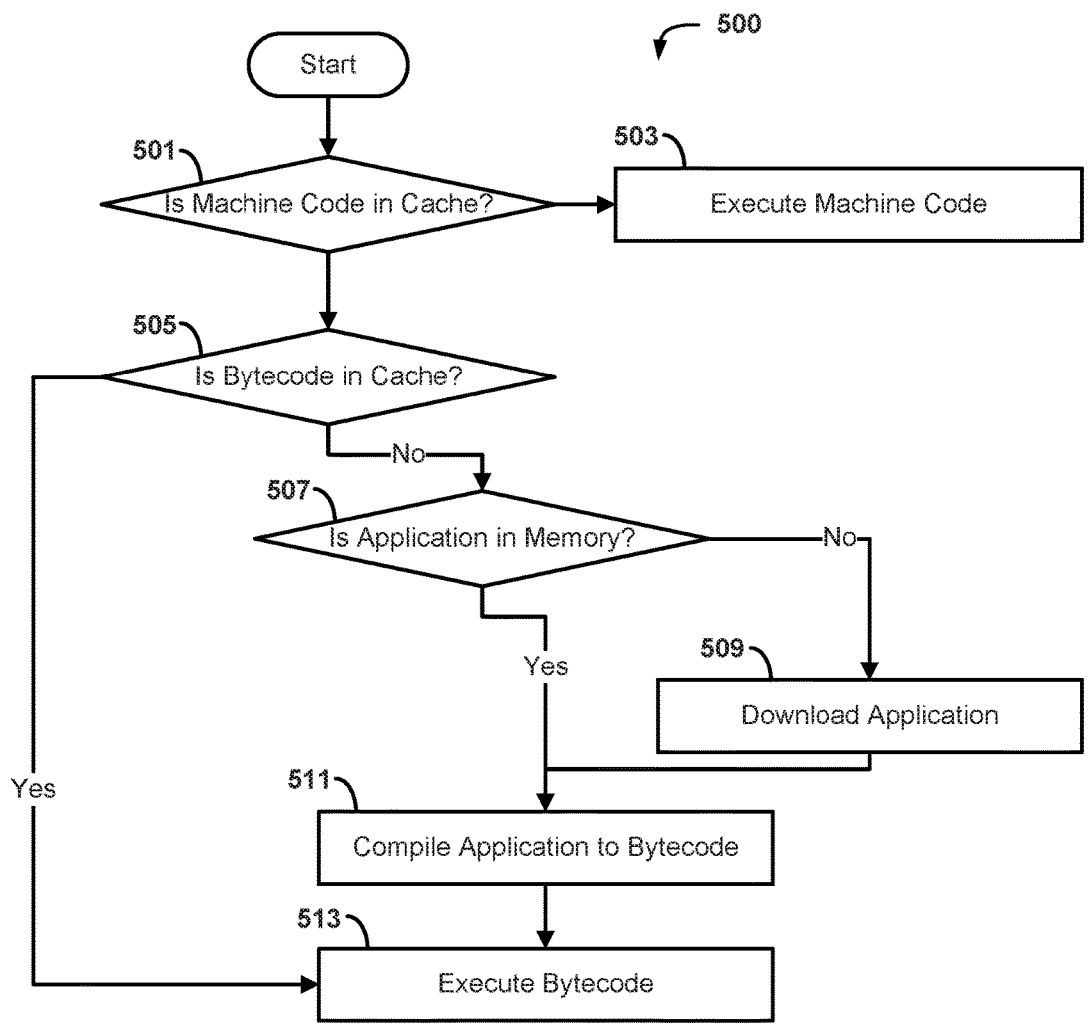
FIG. 5 is a flow diagram of a process of launching an application where machine code is cached according to an embodiment.

In some implementations, there may be some overhead in executing bytecode by a virtual machine. This overhead may be caused by the virtual machine parsing and executing the bytecode at runtime. While this mode of operation is often acceptably fast, some embodiments of virtual machines can pre-compile bytecode to machine code. This machine code is then directly executable by the processor. Caching this machine code may eliminate almost all delay in executing a desired application. This embodiment is illustrated in FIG. 5. For ease of explanation FIG. 5 and process 500 will be described with respect to FIGS. 1A and 1B. However, it should be understood that process 500 is not so limited to the specific embodiments depicted in FIGS. 1A and 1B As shown in FIG. 5, process 500 begins at 501, where it is determined whether machine code for an application to be executed is stored in cache 156. If it is, the cached machine code may be executed directly at 503 and the process may end. According to some embodiments, this is the most direct approach from request to execution of an application.

If, however, at 501, the process determines that machine code representing an application to be executed by the client device 150 is not in the cache 156 of client device 150, then the process 500 proceeds to 505. At step 505, the process determines whether bytecode corresponding to the application to be executed is stored in the cache 156 of the client device 150. If the bytecode corresponding to the application is stored in the cache, then the process 500 may proceed directly to 513 where the application bytecode is executed using, e.g., a virtual machine running on the processor 152 of client device 150.

If at 505 the process determines that bytecode for the application is not stored in the cache, then the process 500 proceeds to 507. At 507, the process 500 determines whether the application is stored in memory (e.g., memory 157) of the client device. If the application is not stored in memory 157, then the client device 150 at 509 may download the application from either the platform server 120 or one of the content providers 135 depending on the particular embodiment. The process 500 may then proceed to 511.

Additionally, if at 507, the process 500 determines that the application is, in fact, stored in memory 157 of the client device 150, then the process 500 may also proceed to 511, where the application is compiled. In some embodiments, the application may be complied to bytecode configured to be executed by a virtual machine running on the processor 152 of the client device 150. However, in some embodiments, the application may be complied into machine code configured to be executed directly by the processor 152 of the client device. After compilation at 511, the application (in either its bytecode or machine code form, depending on the specific embodiment) may be executed at 513.

FIGS. 3-5 (as described above) illustrate different methods of caching applications at varying levels of the code execution process. However, caching at all stages of the application execution process may not always be possible. One limitation can be the size of memory available to dedicate to caching applications. Memory is a limited resource that has many consumers in contention for all available memory. Similarly, computational resources required to compile applications, whether from script to bytecode or from bytecode to machine language, are also limited. Therefore, in an embodiment, the predictive application cache may seek to be as efficient as possible to make improved use of the limited memory resources available and provide improved user experience by pre-caching applications before the user actually issues a command to execute the application. Regardless of the level and type of caching used, whether it is caching at the machine code level, the bytecode level, and/or the script level, the predictive application cache uses similar logic to determine what to cache.

Predicting Application to be Cached

As discussed, a goal of the predictive application cache according to some embodiments is to increase the probability that an application is already loaded in the cache when a user requests it to be launched. This is true regardless of the level of caching implemented, whether it be at the machine code level, the bytecode level, or the source code level. This results in a better overall user experience by reducing perceived loading times between content selection and the start of content playback. In some embodiments, the predictive cache uses available information to make intelligent predictions as to which applications may be requested in the near future to increase the likelihood that requested applications are already in the cache when requested.

Figure 6A:
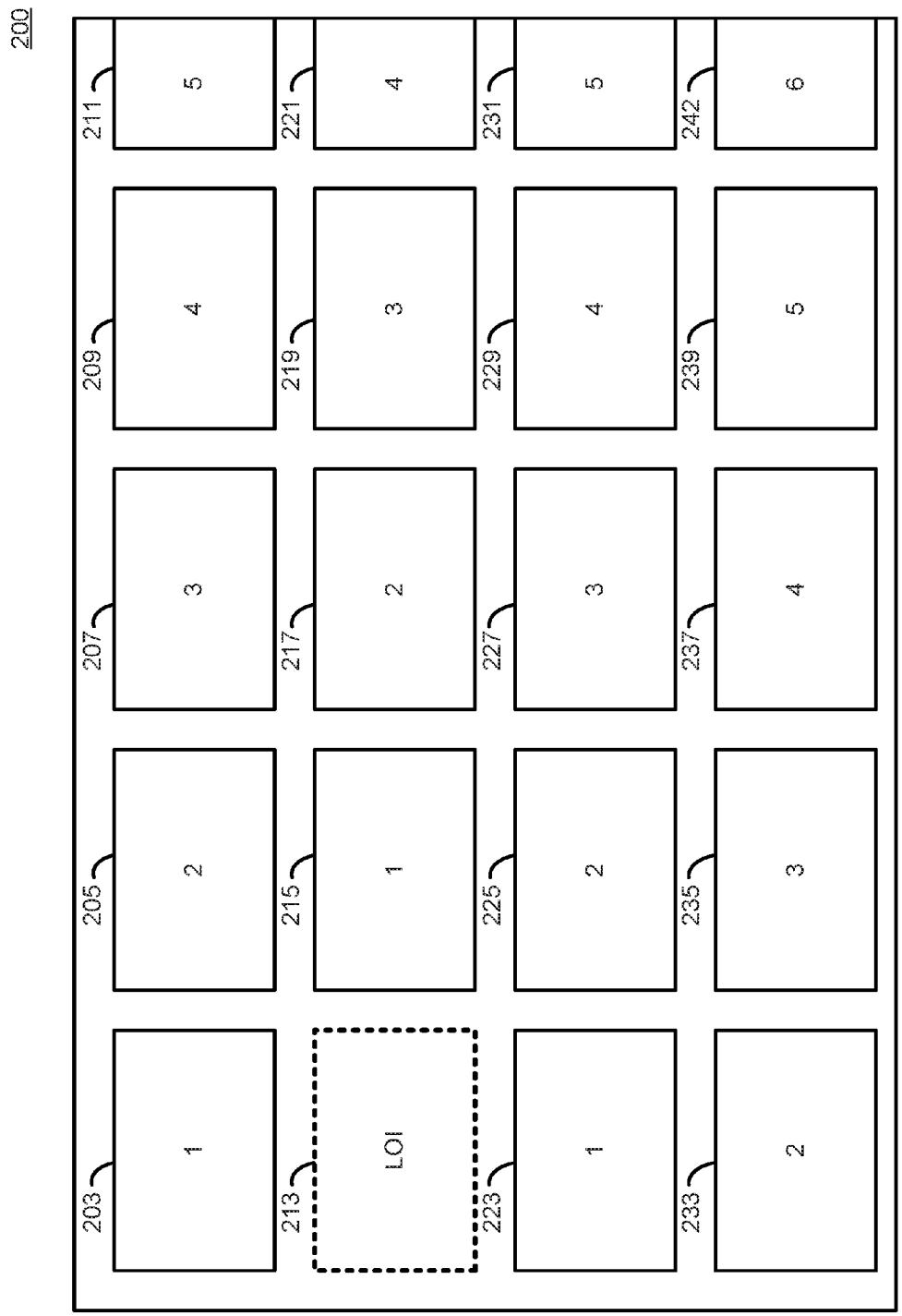
FIG. 6A illustrates an example graphical user interface according to an embodiment.

Such predictions may be based in part on user input that is responsive to the graphical user interface. FIG. 6A illustrates an example GUI similar to that illustrated in FIG. 2. According to some embodiments, the first level of caching prediction is to load the application associated with a currently selected GUI element. For example, in GUI 200, one embodiment of predictive caching would cache the application associated with the GUI element 213 that is the current location of interest (LOI). This reflects a principle that every application launch command must be preceded by selecting a GUI element through the user interface. In other words, in an embodiment, all commands to execute an application are preceded by selecting a corresponding GUI element. This form of prediction may account for the time period in between the user moving the cursor onto the desired graphical user display element and actually selecting the item. This kind of prediction is therefore effective to the extent that there is a delay between the two operations. In some use cases, this time period may be substantial as the user reads the GUI to determine whether or not they want to view the selected media.

According to some embodiments, more information, and better predictions, can be derived from user interaction. The first embodiment of caching described above may have limited utility if the user very rapidly changes selected GUI elements and subsequently rapidly selects one for consumption. Thus, in an embodiment, the predictive cache incorporates information regarding the number of discrete user interactions that would be required to select a given GUI element in the GUI 200. For example, FIG. 6A illustrates a GUI 200 where each GUI element contains a number reflecting the number of discrete user commands that would be necessary to bring the GUI element into the LOI. Because the user can only select or execute a GUI element that is currently the LOI, the predictive cache can use this information to make caching decisions. For example, GUI element 215 is only one discrete user input event away from the current LOI 213, so it is more likely to be selected before GUI element 221 that is four discrete user input events away from the current LOI 213. This reflects the discrete nature of the user input in this embodiment. In order to bring GUI element 221 into the LOI, first GUI element 215 must be brought into the LOI. Thus, in an embodiment, GUI elements with a lower overall count of discrete user input events in the illustration are determined to be more likely to be selected before GUI elements with a higher overall count of discrete user input events.

This analysis yields a propensity matrix (e.g., propensity matrix 154 depicted in FIG. 1B) represented by the numbers in FIG. 6A. The propensity matrix represents the predicted propensity for any given GUI element on screen to be next launched by the user. A lower number reflects a lower number of discrete user interface events to bring into the LOI, and thus a higher propensity that that GUI element will be selected next. Similarly, a higher number reflects a higher number of discrete user interface events to bring into the LOI, and a correspondingly lower propensity that that GUI element will be selected next. According to various embodiments, the client device 150 may store applications associated with GUI elements in cache 156 based on the propensity matrix 154. This process is discussed with respect to FIG. 6B, below.

Figure 6B:
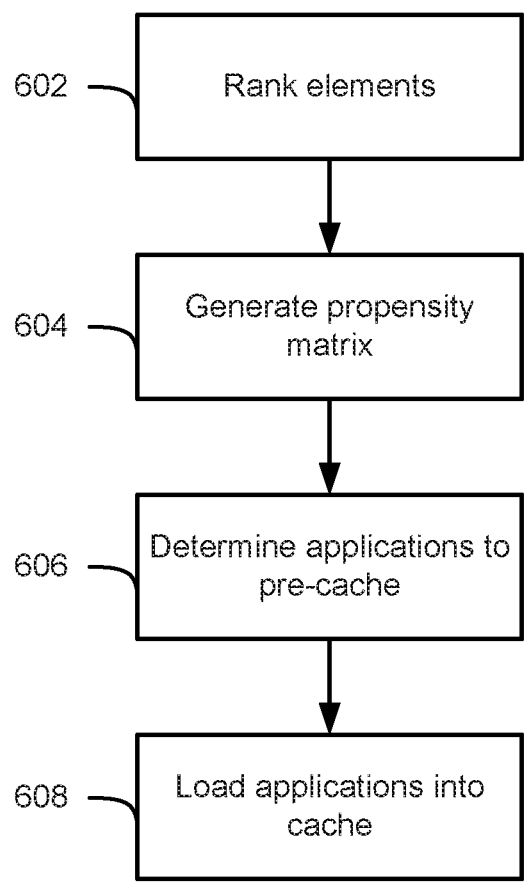
FIG. 6B is a flowchart depicting a process of predictively pre-caching applications according to an embodiment.

FIG. 6B is a flowchart depicting a process 600 for predictively pre-caching applications in the cache 156 of a client device 150 according to various embodiments. For ease of explanation FIG. 6B and process 600 will be described with respect to FIGS. 1A, 1B, and 6A. However, it should be understood that process 600 is not so limited to the specific embodiments depicted in FIGS. 1A, 1B, and 6A.

As shown in FIG. 6B, process 600 begins at 602, where the GUI elements (e.g., GUI elements 203-211, 213-221, 223-231, and 233-241 shown in FIG. 6A) are ranked. In some embodiments the GUI elements may be ranked according to the number of discrete user input required to reach that GUI element from a location of interest (e.g., LOI 213.) In some embodiments, each possible GUI element that a user may possibly select (either displayed on display 140 or not) may be ranked. However, according to some embodiments it is also possible for process 600 to only rank a subset of the entire set of possible GUI elements (e.g., rank only the displayed GUI elements) at 602. The process 600 may then proceed to 604, where a propensity matrix 154 is generated based on the rankings of the GUI elements.

At 606, the process 600 determines one or more applications to pre-cache based on the propensity matrix. For instance, in some embodiments, the process 600 may determine that certain GUI elements with the most likely ranking (e.g., GUI elements 203, 215 and 223 in FIG. 6B) are the most likely to be selected by a user and select for pre-caching the applications associated with those GUI elements. At 608, the process loads the applications determined at 606 into cache 156.

In the above described embodiment, user inputs are assumed to have an equal weight. That is, a movement left input increases the propensity by 1, the same as a movement right input. In an embodiment, not all user inputs are weighed equally. For example, horizontal user inputs moving from one row element to an adjacent row element can be weighted more likely to occur than vertical user inputs moving to another row.

Figure 7A:
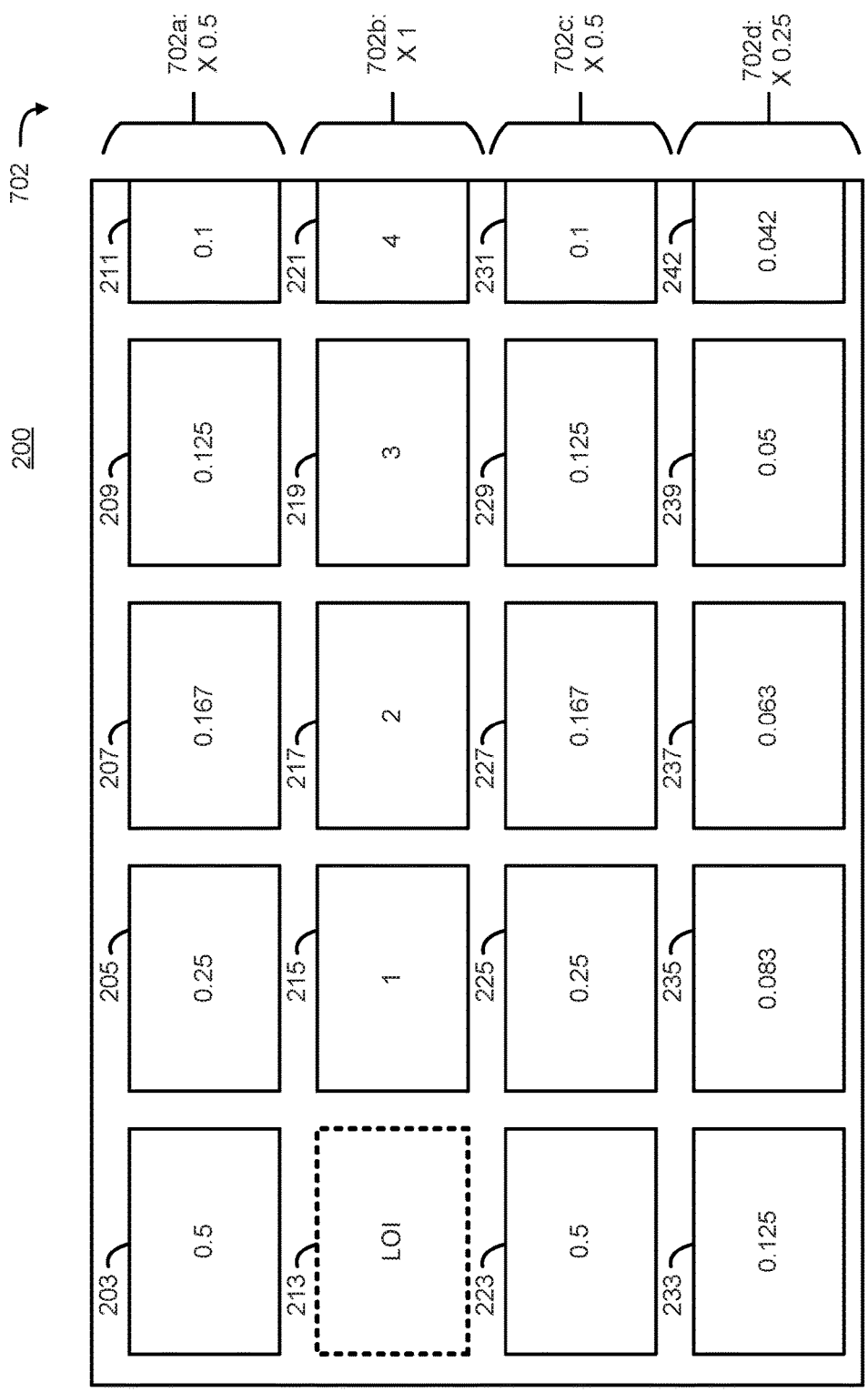
FIG. 7A illustrates an example graphical user interface according to an embodiment.

An embodiment of weighting each row is illustrated in FIG. 7A as a set of multipliers 702, which are applied to each row of the propensity matrix 154. In some embodiments, since propensity is inversely related to the likelihood of selection, the values shown in FIG. 7A constitute the inverse of the distance from the LOI 213 multiplied by the appropriate weight (e.g., one of weights 702) for the row. As shown in the example of FIG. 7A, a weight 702*a* of 0.5 is applied to the first row, a weight 702*b* of 1 is applied to the second row, a weight 702*c* of 0.5 is applied to the third row, and a weight of 702*d* of 0.25 is applied to the fourth row. In this embodiment, a higher weight is given to rows that are closer to the LOI 213. Accordingly, since element 203 has a distance of 1 from the LOI 213, its weighted propensity value is 0.5 (i.e., the inverse of its distance multiplied by weight 702*a*). In a similar fashion, the weighted propensity of element 205 can be calculated to be 0.25, and that of element 207 to be 0.167, and so on. In this way, a bias is built into the propensity matrix that disproportionately weighs different user input. This kind of bias may reflect, for instance, a propensity for users to scroll horizontally rather than vertically.

In an embodiment, propensity weights can be either positive or negative. A negative bias, would reflect an increased probability while a positive bias would reflect a decreased probability. For instance, multiplier 702*a* is illustrated as 0.5, or ½, but may be adjusted to reflect user behavior. It is noted that the example set of multipliers or weights is provided for illustrative purposes only and the values provided may be used or other values depending on the particular embodiment. In another embodiment, the propensity weighting is biased to vertical movement rather than horizontal. This type of bias can be modeled as a column multiplier, similar to the row multiplier discussed above. Column multipliers can similarly be set to unequally weight different columns.

Figure 7B:
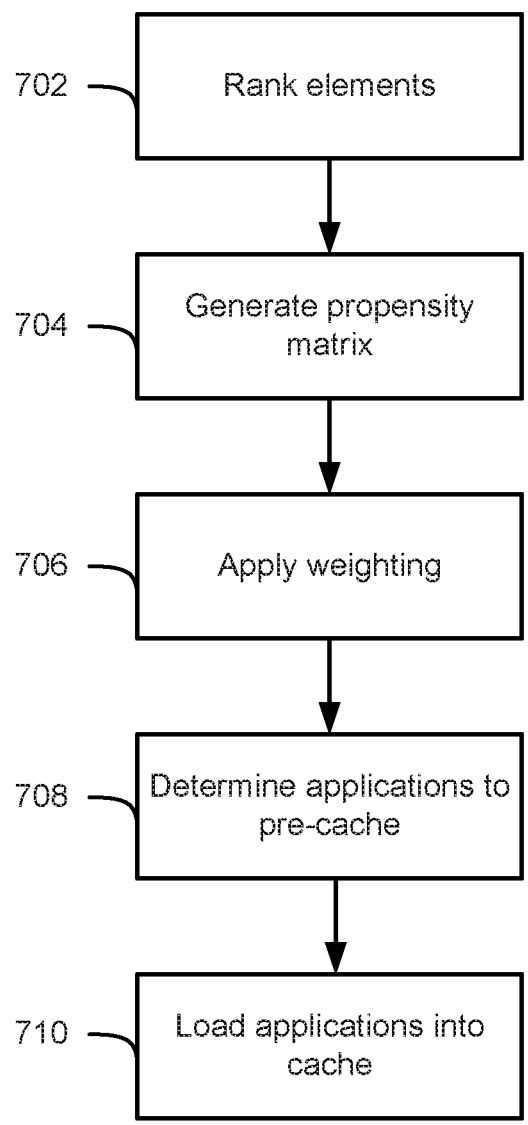
FIG. 7B is a flowchart depicting a process of predictively pre-caching applications according to an embodiment.

FIG. 7B is a flowchart depicting a process 700 for predictively pre-caching applications in the cache 156 of a client device 150 according to various embodiments. For ease of explanation FIG. 7B and process 700 will be described with respect to FIGS. 1A, 1B, and 7A. However, it should be understood that process 700 is not so limited to the specific embodiments depicted in FIGS. 1A, 1B, and 7A.

As shown in FIG. 7B, process 700 begins at 702, where the GUI elements (e.g., GUI elements 203-211, 213-221, 223-231, and 233-241 shown in FIG. 7A) are ranked. In some embodiments the GUI elements may be ranked according to the number of discrete user input required to reach that GUI element from a location of interest (e.g., LOI 213.) In some embodiments, each possible GUI element that a user may possibly select (either displayed on display 140 or not) may be ranked. However, according to some embodiments it is also possible for process 700 to only rank a subset of the entire set of possible GUI elements (e.g., rank only the displayed GUI elements) at 702. The process 700 may then proceed to 704, where a propensity matrix 154 is generated based on the rankings of the GUI elements.

At 706, the process 700 may apply a weight to each of the values in the propensity matrix. According to some embodiments, the weight may relate to a distance of a particular GUI element row to the row in which the LOI (e.g., LOI 213) is located. Additionally, the weighting applied to the propensity matrix may factor in other elements such as historical user behavior and/or the historical behavior of other users.

At 708, the process 700 determines (or selects) one or more applications to pre-cache based on the propensity matrix. For instance, in some embodiments, the process 700 may determine that certain GUI elements with the most likely ranking (e.g., GUI elements 203, 215 and 223 in FIG. 7B) are the most likely to be selected by a user and select for pre-caching the applications associated with those GUI elements. At 710, the process loads the applications determined at 708 into cache 156

In an embodiment, these row and column biases can be equally applied in all directions. The example embodiment illustrated in FIG. 6A reflects an equal propensity bias in both directions. In other embodiments, these biases can be directional to reflect user behavior and tendencies. For example, the row above the LOI may be biased at a first rate, and the row below the LOI may be biased at a second, different rate. This uneven or unequal biasing reflects a user tendency to move in one direction or the other. Similarly, column biases can also be unequal or uneven.

Another predictive user interaction metric is the rate of user input. In an embodiment, the predictive application cache records the time of several past user inputs to determine the rate of change of received user inputs. This information is then used to dynamically alter the row and column propensity matrix. For example, if a user is inputting commands to scroll to the right rapidly, then the propensity matrix is updated to reflect a greater propensity for GUI elements to the right of the LOI and lower propensity for GUI elements to the left of the LOI. If user inputs are sporadic, or very slow, then no discernable deductions can be made from user input and the propensity matrix is unchanged. In this way, the propensity matrix is updated in real time to reflect not only the current display, but also previous user input.

One embodiment of this rate determination uses a filter such as is a high-pass filter. In an embodiment, user inputs are processed by a high-pass filter mechanism. A high-pass filter passes signals with a high frequency and attenuates signals with a low frequency. Here, the time between user interface events, such as a command to move rows or columns, is the signal. A long period of time between events is a low frequency data point. Similarly, a short period of time between events is a high frequency data point. The high-pass filter therefore will attenuate the predictive value of slow user input events and pass fast input events to the predictive calculation. The effect of this type of filtering is to give preference to quick, repetitive user interactions and gradually settle to no net effect as user interface events slow.

This prediction reflects the user's gaze as the user navigates the GUI. A user who is rapidly scrolling is likely scanning new GUI elements for something of interest and is disinterested in the GUI elements presently on screen. The underlying assumption is that if the user wanted to select a GUI element under the LOI, they would not be issuing new commands to move the LOI so quickly. In this scenario, the propensity of stopping and selecting a given GUI element near the LOI is low. A slowdown in user interaction may represent a growing interest and propensity to select a given GUI element that is on screen. Therefore, when a user is rapidly scrolling, an embodiment of the predictive cache weighs elements farther from the LOI greater.

In an embodiment, this weighing takes the form by adjusting a column bias as described above, for example. In another embodiment, the weighting takes place only with respect to GUI elements in a single row. The embodiment that uses rate data to only change the propensity matrix on a single row reflects the fact that while a user is scrolling that row, the other rows remain stationary and their propensity value is therefore unaffected by the user input information. In one embodiment of the user interface, column changes shift rows equally, and thus the row bias effect is applied equally to all visible rows.

Another deduction that is made from user input is that a change of direction likely reflects a change in user interest. For example, if a user scrolls right ten times in a row, but then abruptly switches direction to scroll left, the predictive application cache 156 may respond accordingly because the user's focus has shifted from GUI elements to the right of the LOI to GUI elements to the left of the LOI. A direction change detector then may operate by significantly changing the propensity matrix in response to such a change in direction. In one embodiment, the predictive cache resets the propensity matrix to a pre-defined configuration in response to a rate of change. In another embodiment, the propensity matrix for the row of the LOI is flipped in a mirror image over the LOI to reflect the change of the user's interest from one direction to the opposite direction. The assumption then is that whatever interest or propensity the items to one direction of the LOI the user had, has now shifted to the opposite side.

Figure 8:
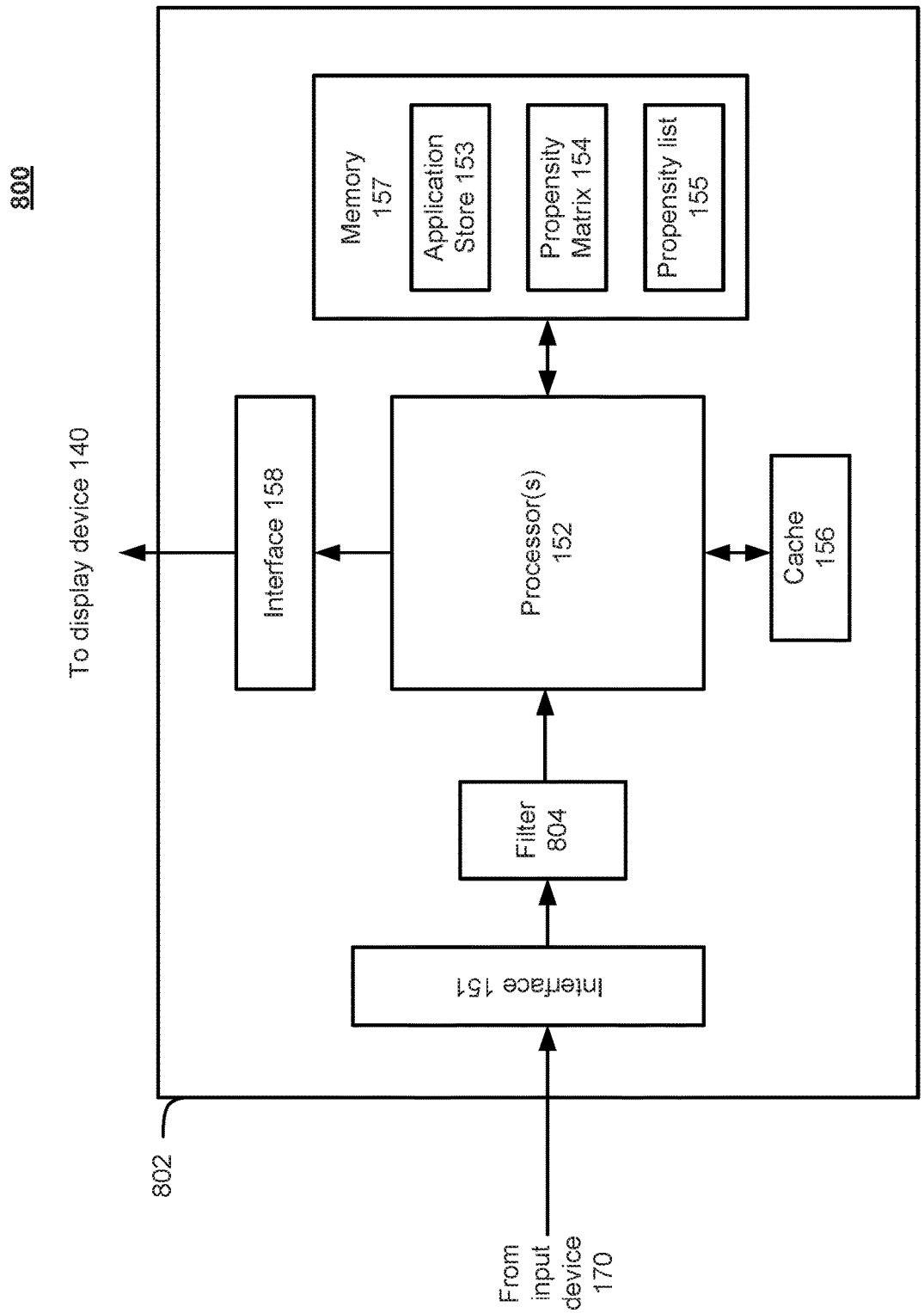
FIG. 8 illustrates the predictive application cache architecture according to an embodiment.

FIG. 8 illustrates the predictive application cache architecture according to an embodiment. In particular, FIG. 8 depicts a client device 802 that is similar to the client device 150 shown in FIG. 1B, however client device 802 has the added element of a filter 804 to filter inputs received at the input interface 151 from input device 170. According to various embodiments, filter 804 may comprise a high-pass, low-pass, or a band-pass filter to name a few examples. Additionally, the filter 804 may be implemented in hardware, software, firmware, or some combination. Also, while FIG. 8 depicts filter 804 as an element discrete from processor 152, in some embodiments filter 804 may be implemented as logic that is part of processor 152.

As shown in FIG. 8, user input from, for example, input device 170 is received by the input interface 151, and passed to filter 804. In some embodiments, filter 804 may be implemented as a high-pass filter to filter user input from the on-screen displayed GUI. The processor 152 may then use the filtered input to populate or modify propensity matrix 154, which is stored in memory 157. Finally, the propensity matrix 154 is compiled into a propensity list 155, which can then also be stored in memory 157. In some embodiments, the propensity list 155 may be a ranked list of applications that should be stored in cache 156. The propensity list 155 may be, according to some embodiments, generated from the propensity matrix 154 by tallying the number of discrete user interactions necessary for each unique application required by all of the GUI elements on screen 200.

Figure 9A:
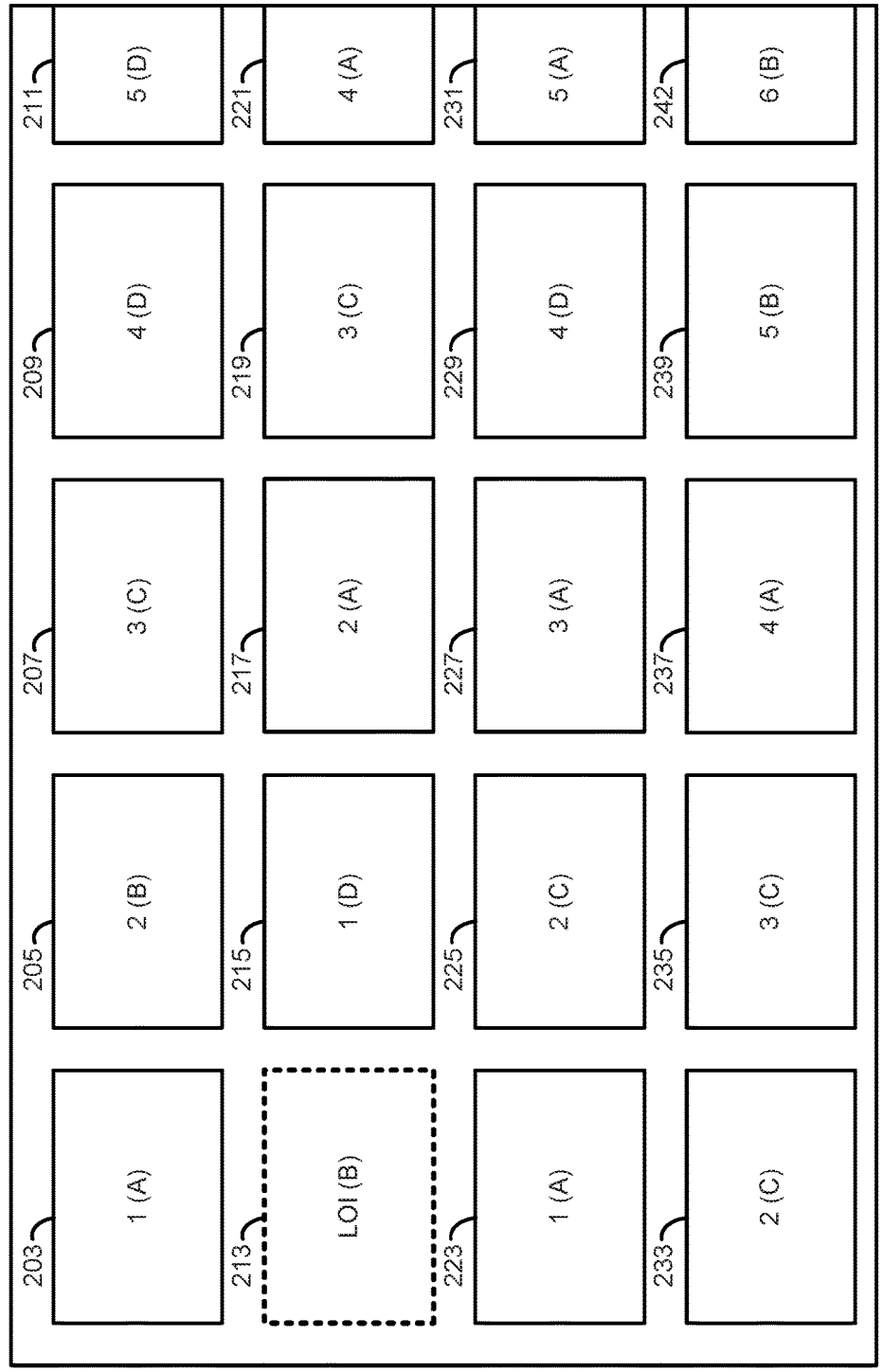
FIGS. 9A-B illustrate an example graphical user interface according to an embodiment.
Figure 9B:
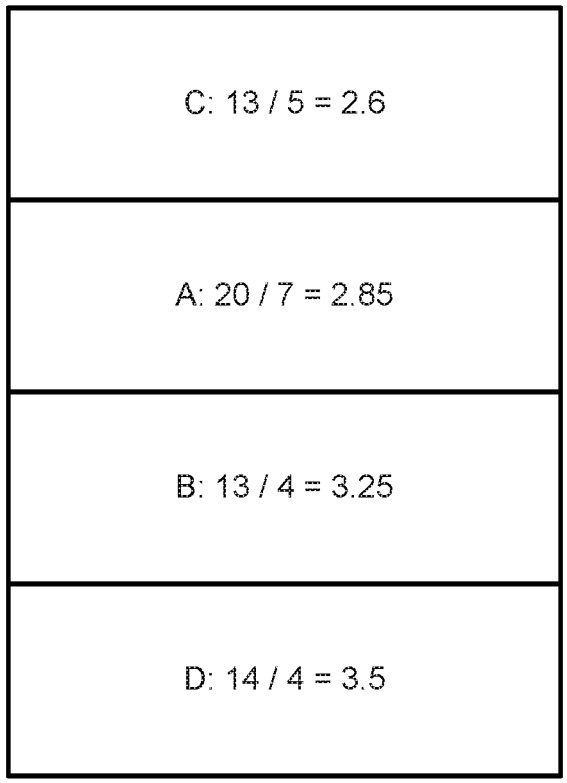

Consider, for example, the example GUI illustrated in FIG. 9A. While there are 20 individual GUI elements on screen, there are only 4 unique applications A, B, C, D, that are associated with all 20 GUI elements. For example, user applications A, B, C, D may represent different streaming media providers, with each GUI element 203-241 representing a different movie that is available from each provider. The propensity list, then, is an ordered ranking of the applications A, B, C, and D that corresponds to the total likelihood or propensity of being selected next. According to some embodiments, the total propensity is the sum of all user interactions to select an application, divided by the number of GUI elements corresponding to that application. This represents the average number of user interactions required to select a given application. For example, FIG. 9B illustrates the propensity list 900 corresponding to FIG. 9A. This propensity list 900 reflects that for a user to select a GUI element (e.g., GUI element 203-241) that is associated with application C, an average of 2.6 discrete user inputs is necessary. Similarly, to reach for a user to select a GUI element that is associated with application D, an average of 3.5 discrete user inputs is necessary. Therefore, the predictive application cache prioritizes application caching in the order proscribed by the propensity list 900 to have the best probability of having the next requested application in cache. In an embodiment, the values in the propensity list 900 are calibrated or normalized to a predefined scale. For example, in an embodiment, the values are normalized such that the largest value is always 1.0, and all other propensities are proportionate values between 0 and 1. This is accomplished by dividing all values in the propensity list by the largest value. Then, a higher value indicates a lower overall probability that a given application will be selected, while a lower value reflects a higher overall probability that it is selected.

Predictions Based on Usage History

In addition to GUI-based propensity calculations, the propensity list can be further modified by historical user interaction. Such an embodiment is depicted in FIG. 10.

Figure 10:
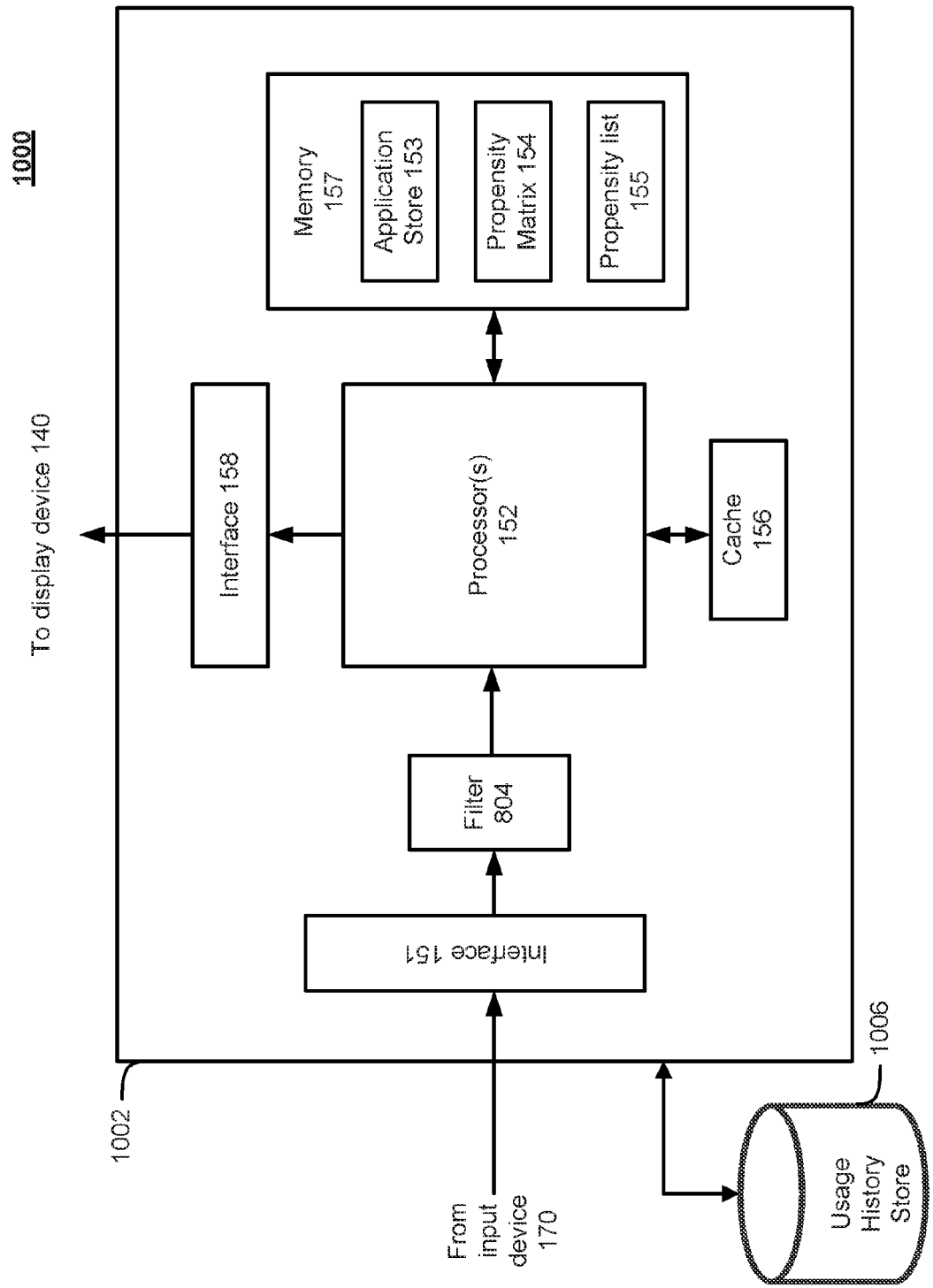
FIG. 10 is a block diagram of a data streaming device that incorporates usage history data according to an embodiment.

FIG. 10 is a functional block diagram depicting a client device 1002 similar to client device 150 shown in FIG. 1B and to client device 802 shown in FIG. 8. However, the client device 1002 of FIG. 10 has the addition of receiving usage history data from a usage history store 1006. According to some embodiments, usage history store 1006 may comprise a database external to the client device stored, for instance, on platform server 120. Additionally, usage history store may, in some embodiments, be part of the memory 157 of client device 1002 or it may be a separate memory that is part of client device 1002.

In the embodiment illustrated in FIG. 10, the client device 1002 may be configured to record application usage time and duration data and store that data in usage history database 1006 either directly or by transmitting it via, e.g., network 160 to platform server 120. Processor 152 may then incorporate usage history information from the usage history store 1006, which incorporates the filtered user input received from filter 1004 to produce a propensity list 155. Usage history data may be used to adjust the propensity list 155 or propensity matrix 154 to reflect user preference or behavior.

For example, if a certain streaming media device's usage history reflects heavy usage of application A, but very little of application B, the propensity list 155 may be adjusted to give application A a higher weight. This can be accomplished by adjusting the numbers associated with each application (e.g., applications A, B, C, and D) in the propensity list 155. For example, if a user's history reflects a 90% usage of application A, and a 10% usage of all other applications combined, the predictive cache may use that fact to deduce that the user is more likely to select media associated with application A. The appropriate response to this history and analysis may be, for example, an addition of some value to application A in the propensity list. The overall influence of user history versus user input can be balanced at this stage to reflect a bias towards either data source. For example, in an embodiment, the weight of user history is calibrated to be equal to the total weight of user input predictive value. In another embodiment, the relative weight of each type of predictive input can be changed to reflect different operating assumptions.

Other forms of usage history 1006 can also be recorded and impact the propensity matrix or list. For example, in an embodiment, usage history is recorded and stored in usage history store 1006 with granular detail of which media is played. This granular detail may include any information about the media, such as the standard-based rating (e.g., MPAA movie ratings), actors, directors, year of creation, genre, critical ratings (e.g., critic's star ratings or number of thumbs up), or any other available metadata about the media. Then, the propensity matrix 154 can be adjusted in the by the processor 152 to reflect a bias for or against any trends discernable from this recorded usage. For example, if a user has a preference for 'G' rated animated films, media that matches that metadata can be given a higher propensity in the propensity matrix 154.

An embodiment of this type of prediction uses machine learning techniques to generate predictions. Examples of machine learning techniques that can be used include but are not limited to neural networks, Bayesian classifiers, support vector machines, or other such machine learning algorithms. In another embodiment, sets of rules are implemented in an expert system to deduce predictive value from recorded usage. Regardless of what type or class of algorithm used, the inputs to the system are the history of usage on the media streaming device and the output is some type of modification to the propensity matrix or the propensity list.

As discussed above, some embodiments of the predictive cache incorporate past usage of applications on the streaming media device to help predict future behavior on that same device. In an embodiment, the predictive cache also incorporates data from users of other streaming media devices as well. This is referred to as "crowd sourcing" because the information is sourced from a "crowd" of other users.

In one embodiment of crowd sourcing, usage history from multiple media streaming devices is combined in a central clearinghouse of data. For example, in an embodiment a centralized system (such as a centralized server) receives the usage history from many media streaming devices, performs analysis on the data, and then re-distributes prediction information back to the media streaming devices to incorporate into future predictions. The analysis performed in one embodiment is substantially similar to that performed on individual usage history described above, but with more data from a plurality of users. In this way, trends in behavior across the user base will be aggregated into one prediction set.

This prediction set may take the place of a propensity list 155 or a list of alterations to a propensity matrix 154. If the prediction set is a propensity list, it is incorporated into and combined with the other propensity lists described above in a manner similar to how individual usage history is. For example, if there is a discernable trend among a wide user base that application B is commonly used, then the crowd sourced propensity list 155 would reflect a greater likelihood that application B might be launched by any given user in the user base. Similarly, a list of alterations to a propensity matrix 154 reflects a correlation between some type of metadata and a greater or lower propensity for the user to select a unit of media with a corresponding property. For example, if the usage history of a large user base reflects a greater likelihood of selecting a movie starring a particular actor, then the prediction set might include an entry that instructs the client device 150 to alter a propensity matrix 154 to reflect that change.

In another embodiment, the individual media streaming devices do not share usage history directly, but rather contribute predictive sets to the centralized repository for aggregation. Again, the type of data supplied to the central repository would then be either a separate propensity list or a list of alterations to a propensity matrix. The centralized repository then aggregates predictive sets together to derive a common predictive set which is then distributed back to all participating streaming media devices.

Cache Architecture

The output of the prediction engine and the various methods of generating predictions described above is an ever-changing list of what applications are likely to be selected next. This list is ordered and numerically scored to reflect the prediction engines confidence in the prediction. In an embodiment these numerical scores are normalized to a set range for processing by the cache controller. For example, in some embodiments, prediction scores in the prediction list can be normalized to between 0 and 1, with higher scores calibrated to reflect a greater probability of being selected. The second part of the predictive cache is to use this information to ensure the greatest likelihood that those applications with the strongest prediction values are in fact in cache memory. The prediction list can change rapidly in response to user input, so the cache strives to get or keep the cache full of the applications with the highest probability of being selected.

In an embodiment, the cache controller updates the contents of the cache in response to each user input command. In some embodiments, the cache controller starts processing the newly created propensity list immediately, and in other embodiments the cache controller waits a small delay before starting to fill the cache. This small delay accounts for rapid user input, that is, the cache controller can wait for idle resources before starting the cache filling process. In addition, a user may issue a user interface command while the cache controller is actively processing a propensity list and filling the cache. If this happens, the propensity list may change in response to the user input, and the data that the cache controller is working, on may no longer reflect the most current information. In such an event, the cache controller may stop processing the old, stale propensity list and start working on the new one. In other embodiments, the cache controller does not stop in the middle of a cache fill operation and continues to process. This may be appropriate when the hardware of the media streaming device has sufficient processing resources to handle multiple operations simultaneously.

In any event, the cache fill process aims to fill the cache with the most likely applications to be launched next at any given time. Additionally, the cache fill process removes low-priority applications from the cache to make room for applications with a higher priority. In an embodiment, the cache maintains a list of the predictive value of each cached element. For example, if application A is inserted to the cache with a predictive value of 0.9, the cache controller maintains that predictive value as metadata about the cache content. Then, if the cache controller has an application Z to insert into cache, but the associated predictive value of application Z is low, for example 0.1, then the predictive cache would not remove application A to make room for application Z. In an embodiment, to account for the time-sensitive nature of the stored predictions, a decay function is applied to the stored predictive value such that it gradually decreases over time. This decay function can be, for example, an exponential decay, a logarithmic decay, or a linear decay function. The parameters of the decay function can be selected and modified by a person of skill in the art to meet the needs of the implementation. When a new prediction list is processed that contains the same application as one already stored in cache, the cache controller adds the newly predicted value to the stored, decayed value to come up with a new stored prediction value. In this way, applications that are frequently in predictive lists processed by the cache controller stay in the cache with high prediction scores. In an embodiment, these added values can be capped at a set maximum predictive value, or all stored predictive values can be normalized to a standard value to avoid prediction scores increasing beyond a set range.

In the event that the cache controller cannot determine which application or applications to remove to make room for a new application, several deadlock resolution techniques are available to the cache controller. Such a scenario could occur when, for example, all elements in the cache have an equal prediction value and the prediction list also has the same prediction value. Then, the cache controller cannot deduce which applications to remove and which to add, as all have an equal prediction value associate with them. In an embodiment, the cache controller uses a first input first output (FIFO) approach to resolve deadlocks like this. Under this method, the oldest cached application in the cache will be removed to make room for a new application.

In some embodiments, the application cache may use a least-recently-used (LRU) approach to resolving deadlocks. The LRU approach operates by retaining the most recently used applications in cache (e.g., cache 156) and removing the least recently used applications. This requires tracking when each application stored in the cache 156 is requested from the cache 156, or at least when the last time an application was requested from the cache.

According to some embodiments, the application cache may resolve deadlocks in a cache (e.g., cache 156) based on the frequency that the applications are used. This is referred to as the least-frequently-used cache (LFU) approach. The LFU approach is similar to the LRU approach, but differs in that it retains the most frequently used applications in cache (rather than the most recent) and discards the least frequently used (rather than the least, recent). This approach reflects the principle that some applications are likely to be requested from cache more often than others, and prioritizes those items over others that are less frequently requested.

Operation

In all embodiments, the application cache may take the form of a bytecode cache, a source code cache, a machine code cache, or some combination thereof. In an embodiment, the predictive cache contains two or more levels of cache. For example, one embodiment includes both a source code cache and a bytecode cache. Translating or compiling source code to byte code takes processing time and resources, therefore the predictive cache should only compile and store bytecode for applications that have a higher likelihood of being launched. Therefore, in an embodiment, the bytecode cache is reserved for the higher priority applications and the source code cache is reserved for lower priority applications. One example of this type of distinction would be to cache bytecode for applications with a predictive score above a certain threshold, and only cache source code for applications with a predictive score below that threshold.

Figure 11:
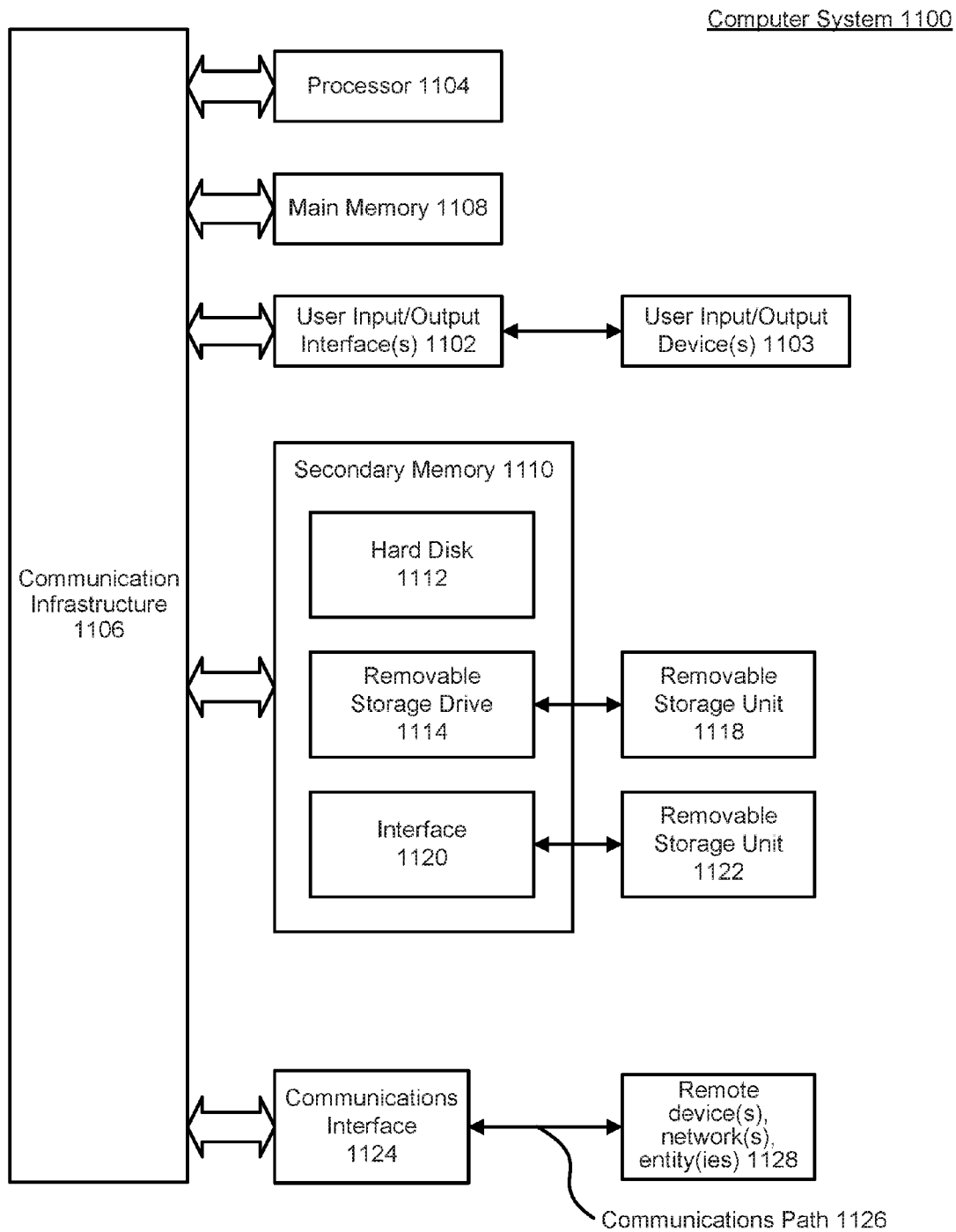
FIG. 11 illustrates a computer system according to an embodiment.

Embodiments shown in FIG. 1-10 can be implemented, for example, using one or more well-known computer systems or one or more components included in computer system 1100 shown in FIG. 11. Computer system 1100 can be any well-known computer capable of performing the functions described herein.

Computer system 1100 includes one or more processors (also called central processing units, or CPUs), such as a processor 1104. Processor 1104 is connected to a communication infrastructure or bus 1106.

One or more processors 1104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102.

Computer system 1100 also includes a main or primary memory 1108, such as random access memory (RAM). Main memory 1108 may include one or more levels of cache. Main memory 1108 has stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/or any other computer data storage device. Removable storage drive 1114 reads from and/or writes to removable storage unit 1118 in a well-known manner.

According to an exemplary embodiment, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

In an embodiment, a tangible apparatus or article of manufacture comprising a tangible computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein.

CONCLUSION

Based on the teachings contained in this disclosure, it will be apparent to persons skilled in the relevant art(s) how to make and use embodiments of the invention using data processing devices, computer systems and/or computer architectures other than that shown in FIG. 11. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting, the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A streaming media system, comprising:
a cache memory; and
one or more processors configured to:
   first determine a number of discrete user input events to select each element of a plurality of elements displayed in a graphical user interface based on a location of interest (LOI), wherein each element is associated with an application;
   second determine, based at least on the determined number of discrete user input events, a probability of each element displayed by the graphical user interface being selected for execution;
   generate, from the second determination, a list of applications associated with the elements having a greatest probability to be selected for execution; and
   load the applications on the list into the cache memory.

2. The streaming media system of claim 1, wherein the cache memory comprises a source code application cache memory, and wherein the one or more processors are further configured to load the applications on the list by loading source code associated with the applications on the list into the source code application cache memory.

3. The streaming media system of claim 1, wherein the cache memory comprises a byte code application cache memory, and wherein the one or more processors are further configured to load the applications on the list by loading byte code associated with the applications on the list into the byte code application cache memory.

4. The streaming media system of claim 1, further comprising:
an input memory configured to store input data, and wherein the one or more processors are further configured to:
determine a rate of change of user input based on the stored input data in the input memory; and
modify the probability associated with each element based on the determined rate of change of user input.

5. The streaming media system claim 1, wherein the one or more processors are further configured to:
generate the list of applications by grouping the plurality of elements by their associated applications; and
aggregate, for each group, the probability of each element being selected for execution.

6. The streaming media system of claim 1, further comprising:
a usage history memory configured to store a history of application usage, and wherein the one or more processors are further configured to:
determine the probability of each element based at least on the history of application usage stored in the usage history memory.

7. A method of predictive application caching, comprising:
first determining a number of discrete user input events to select each element of a plurality of elements displayed in a graphical user interface based on a location of interest (LOI)), wherein each element is associated with an application;
second determining, based at least on the determined number of discrete user input events, a probability of each element displayed by the graphical user interface being selected for execution;
generating, from the second determination, a list of applications associated with the elements having the greatest probability to be selected for execution; and
loading one or more applications on the list into a cache memory.

8. The method of claim 7, further comprising:
detecting the location of interest in the graphical user interface based at least on input data relating to one or more of the plurality of elements displayed in the graphical user interface.

9. The method of claim 7, further comprising:
calculating a weight for each of the applications on the list based at least on input data relating to one or more of the plurality of elements displayed in the graphical user interface.

10. The method of claim 9, wherein the calculated weight is based at least on usage history data.

11. The method of claim 7, wherein the loading the application into a memory comprises compiling the application from a first format to a second format.

12. The method of claim 7, wherein the loading the application into a memory comprises:
loading the application with the greatest probability into the cache memory.

13. The method of claim 7, wherein the second determining comprises performing a statistical calculation based on the determined number of discrete user input events.

14. A predictive application cache system, comprising:
a cache memory; and
one or more processors configured to:
receive graphical user interface data, wherein the graphical user interface data comprises a plurality of elements, and wherein each element is associated with an application;
receive historical usage information relating to application usage;
determine a number of discrete user input events to select each element in the graphical user interface based on a location of interest (LOI);

select an application to be cached, based at least on the graphical user interface data, the determined number of discrete user input events, and the historical usage information; and load the determined application into the cache memory.

15. The system of claim 14, wherein the historical usage information comprises crowd sourced data from one or more remote sources.

16. The system of claim 14, wherein the one or more processors are further configured to select the application to be cached based on a probability that the application will be used.

17. The system of claim 14, wherein the one or more processors are further configured to load the determined application into the cache memory by compiling source code associated with the determined application into bytecode, and storing the bytecode in the cache memory.

18. The streaming media system of claim 1, further comprising:

an input memory configured to store input data, and wherein the one or more processors are further configured to:

determine a change of direction to user input based on the stored input data in the input memory; and modify the probability associated with each element based on the determined change of direction to user input.

* * * * *